Aug. 19, 1969  L. R. NEWFARMER  3,461,979
RESONANT VIBRATORY DRIVING OF SUBSTANTIALLY HORIZONTAL PIPE
Filed April 21, 1967  2 Sheets-Sheet 1

INVENTOR:
LEO R. NEWFARMER
BY: *[signature]*
HIS AGENT

Aug. 19, 1969  L. R. NEWFARMER  3,461,979
RESONANT VIBRATORY DRIVING OF SUBSTANTIALLY HORIZONTAL PIPE
Filed April 21, 1967  2 Sheets-Sheet 2
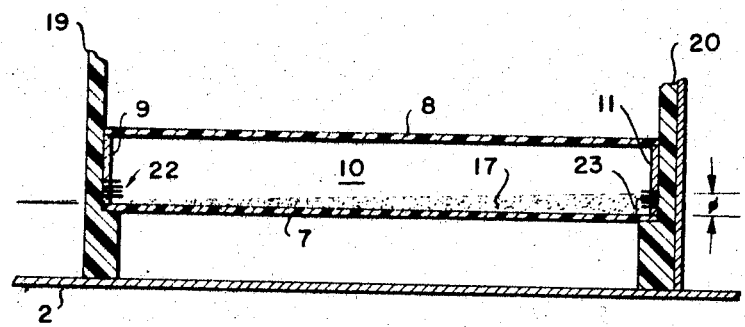
FIG. 5
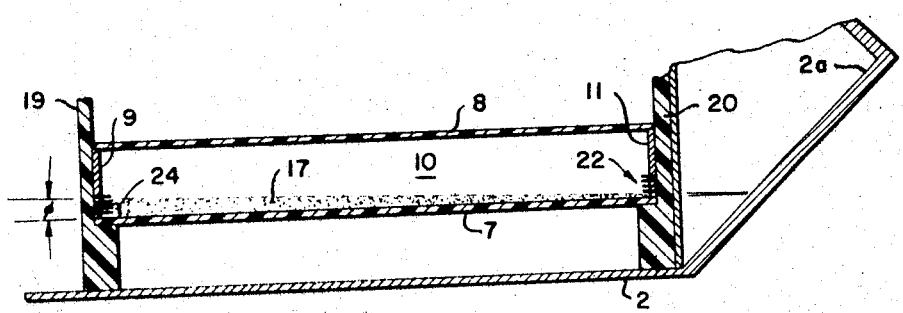
FIG. 6
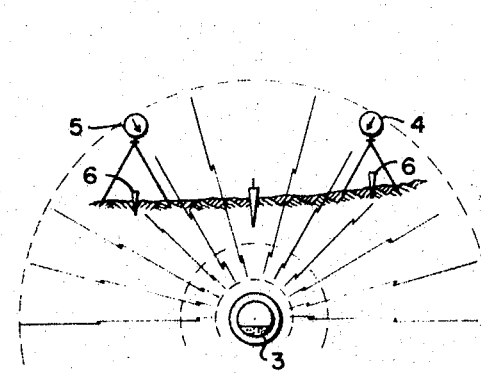
FIG. 7
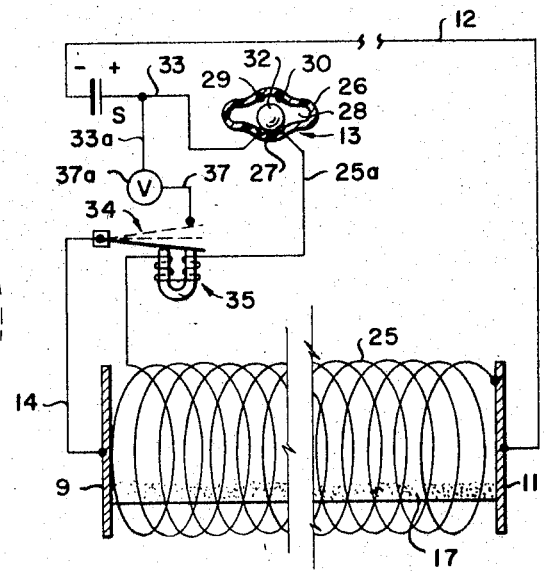
FIG. 8
FIG. 8A
INVENTOR:
LEO R. NEWFARMER
BY:
HIS AGENT United States Patent Office 3,461,979
Patented Aug. 19, 1969

1

3,461,979
RESONANT VIBRATORY DRIVING OF SUB-
STANTIALLY HORIZONTAL PIPE
Leo R. Newfarmer, La Jolla, Calif., assignor to Shell
Oil Company, New York, N.Y., a corporation of
Delaware
Filed Apr. 21, 1967, Ser. No. 632,595
Int. Cl. E21b 47/024, 7/04
U.S. Cl. 175—45                                    10 Claims

ABSTRACT OF THE DISCLOSURE

An elongated pipe is driven substantially horizontally through an earth formation by resonant vibratory means. An inclinometer which comprises an annular chamber of non-conductive material with a conducting ring in each end of the chamber and being partially filled with a conductive material to form part of an indicator circuit which is interrupted when tilted an excessive amount is placed in the forward end of the conduit or other elongated member that is being driven substantially horizontally through the earth. The instrument also contains a second part of the circuit which includes electromagnetic field-inducing means and is provided with means in the instrument responsive to the vibration of driving to switch from the clinometer circuit to the magnetic circuit. Electromagnetic sensing and indicating instruments are placed along the desired path of the conduit to receive the magnetic signal and indicate its lateral position relative to the desired course.

---

This invention relates to resonant vibratory driving of substantially horizontal underground conduits, pipes and the like and also to method and apparatus for indicating the attitude and position of the head end of a conduit or pipe being driven horizontally or at low angle of inclination by a resonant-sonic method such as is described in U.S. Patent No. 3,283,833, or by other vibratory methods.

A sonic resonant vibratory driver provides an effective system for pushing relatively long lengths of pipe or other elongated structural members on horizontal straight courses or at low angles of inclination through soil, as, for example, beneath highways, built-up areas, etc., for utility installations or other such purposes. Other vibrators also known in the art might be similarly used. In practice the conduit to be driven sonically is usually metal pipe of between 6 inches and 18 inches diameter coupled together in joints 10 to 20 feet in length. Sometimes much longer sections are used, if the terrain permits their handling and aiming. The head-end of the pipe may be directed against a nearly vertical bank of soil such as in an embankment or the wall of an excavated pit. A longitudinal vibration at substantially the resonant frequency of the pipe is then applied by a mechanical oscillator clamped to the rear end of the pipe. This, together with an accompanying forward pressure applied and aimed in several ways, such as for example sighting along the pipe and the desired course, causes the pipe to penetrate the ground rapidly and usually quite accurately in the direction in which it is aimed and along the desired course.

Space at grade-level is usually confined; hence, the operation is intermittent because only short pipe lengths can be coupled on a previously driven pipe at any one time. As soon as one joint is driven the vibration is stopped while the oscillator is disconnected, retracted the length of a joint, and the next joint is added to the column. Then vibration accompanied by the forward push is resumed. Successive joints are added and coupled on in this way until the head-end of the driven pipe emerges into another opening or prepared excavation at the opposite end of the course. The alternations between periods of vibratory motion and rest are utilized in the present invention to make certain functions automatic, as will shortly be made clear.

A short column of pipe is relatively rigid and unlikely to bend in the early stages of a drive. It is only after the column is extended by several joints that sometimes soil variations or random obstructions combine in such a way as to deflect the lead-end or head-end of the pipe, causing it to bend to one side off-course or downward or upward off-grade. Such deflections or deviations from the desired course if detected when or soon after they occur can usually be corrected. This may be done, for example, by backing up a short distance and redriving with greater or lesser forward pressure, by deflection tools affixed to the forward end, by lateral bias applied at the rear-end, by guidance rods driven vertically alongside at the point of trouble, or by other such corrective measures.

It is a primary object of the present invention to provide a method of more accurately driving horizontal structural member by providing a method of detecting excessive axial deviation from a desired course of the forward end of the structural member hereafter referred to for brevity as a column of pipe.

Another object of the present invention is to provide an instrument which will warn the operator of the driving machine whenever the forward end of the column of pipe being driven becomes inclined upward or downward at an angle greater than is permitted by the specifications for that particular drive.

A further object is to warn the machine operator whenever deflections to the right or left of the desired course or alignment exceed the maximum which can be tolerated.

A still further object is to provide a simple, rugged sensing instrument capable of functioning with the required accuracy in the environment of violent alternate accelerations which characterize resonant-sonic, sonic, or simple vibratory driving, and at any position of rotation about the longitudinal axis of the conduit or member being driven.

A still further object is to provide a means for presetting a clinometer portion of the aforesaid sensing instrument so that adherence to deliberately inclined grade will be monitored in the same fashion as for horizontal or nearly horizontal drives.

Resonant vibratory horizontal driving is a new art and the physical conditions which prevail near the forward end of a pipe vibrating longitudinally either in resonance or at other frequencies present certain difficulties which render unsuitable any prior remote deviation-detectors known to the art. The vibratory motion at the same time presents certain advantages for a new kind of instrument which would not be employed if the pipe were simply driven as by impact blows or rotating as a boring tool.

In accordance with the practice of the present invention, the forward end of an elongated pipe that is being driven is provided with an instrument which sends a signal when inclined more than the permitted angle, and generates an electromagnetic signal when driving is halted so that its lateral position may be determined by magnetic sensing and indicating instruments placed along the desired course above the surface of the ground.

An understanding of the present invention and the method and apparatus by which use is made of the advantages, and by which the difficulties are overcome, can best be gained by turning now to the following description of the present invention and by examination of the figures presented to illustrate typical embodiments of it.

FIGURE 5 is a cross-section illustrating an adjustment device enabling the monitoring of down-grade inclined driving.

FIGURE 6 is a cross-section showing the adjustment device for monitoring up-grade driving.

FIGURE 7 is a profile cross-section through a pair of alignment monitoring stations.

FIGURE 8 is a wiring diagram which may be employed in a method of providing automatic switching from clinometer to magnetic-alignment circuits by cessation or resumption of vibration.

Figure 1:
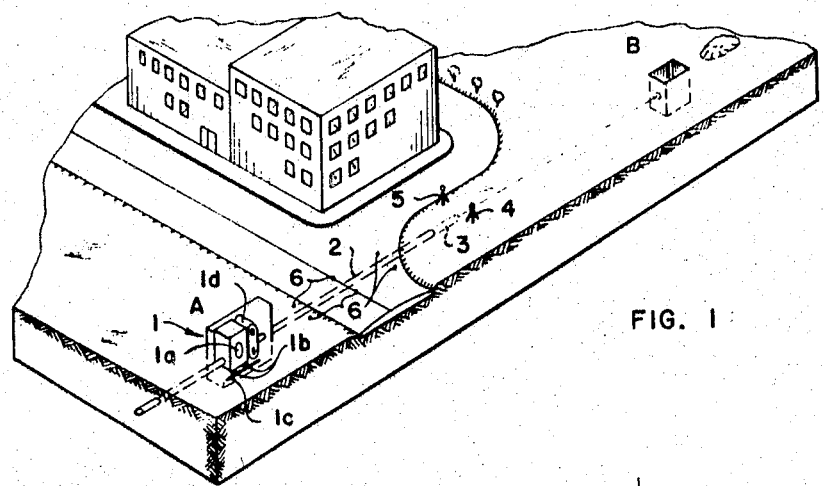
FIGURE 1 is a perspective diagram showing relative positions of an oscillator-driver, a horizontal pipe-column being driven and underground and aboveground sensing components.

Referring to FIGURE 1, position A is a trench from which it is desired to drive underground straight conduit, as for an electric cable, to position B, another trench or opening in the ground several hundred feet away. The surface of the intervening ground may be considered occupied by paving, highway grades, some buildings, etc., but is accessible at various places along the route. Oscillator 1d is mounted on suitable carriage means and operatively connected to and excites a sonic vibration in conduit 2, simultaneously therewith a forward bias is exerted thereon by prime mover or propulsion means schematically illustrated at 1a and aimed by survey-oriented guidance means, not shown. The carriage may be propelled forward to exert a bias on the conduit any suitable manner such as, for example, those shown in U.S. Patent No. 3,283,833. However, a preferred embodiment as shown herein schematically for the sake of clarity, the carriage is self-propelled by means of prime-mover means 1a mounted thereon and coupled in any suitable manner to driving wheels 16 which engage tracks 1c.

A sensor and signal-generating means 3, described hereinafter in detail, which may be, as illustrated in a preferred embodiment, alternately an electric clinometer and a strong electromagnet, is concentrically mounted inside the leading end of conduit 2. Magnetic sensing means such as for example, pre-calibrated magnetic dip-needle instruments 4 and 5 of a type commonly used in prospecting for magnetic ores and corrected to respond alike to a given magnetic intensity are stationed by pairs at points such as 6 (FIGURE 7) above ground on either side of the center line of the course and equidistant from its vertically projected desired course or surface trace. The readings on these instruments are visually observed as the head of the conduit passes beneath and an observer may communicate the observed indications to the driving crew in any suitable manner such as, for example, by hand signals.

Figure 2:
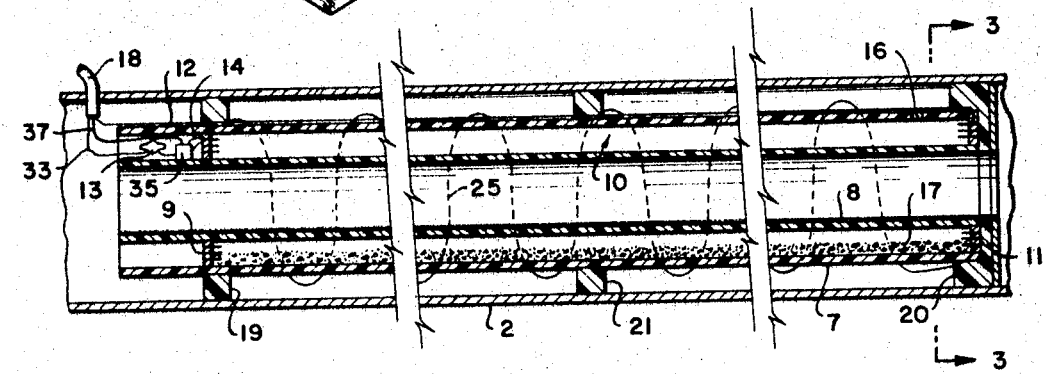
FIGURE 2 is a longitudinal section of the main sensing component, essentially an electro-clinometer which alternates as an electromagnetic source in the form of a double-walled cylinder which "rides" inside and at the forward end of the pipe being driven.
Figure 3:
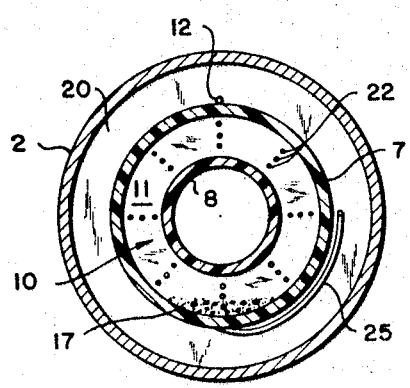
FIGURE 3 is a cross-section of the sensing component taken along the line 3—3 of FIGURE 2.
Figure 4:
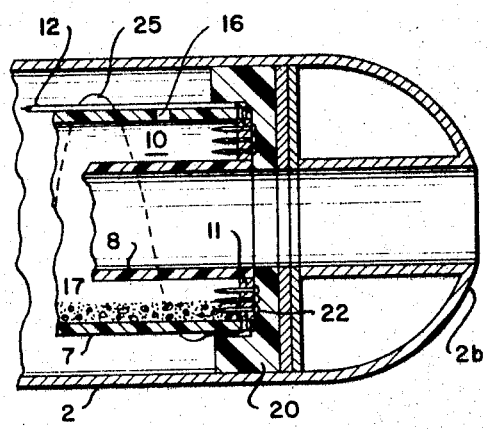
FIGURE 4 is enlarged detail, taken in cross-section, of the head-end of the main sensing instrument showing its essential features.

One embodiment of the main sensing and signal generating instrument 3 is shown in detail in FIGURES 2, 3 and 4. It comprises attitude responsive means comprising two concentric cylindrical tubes, 7 and 8, held together by end plates 9 and 11 fitted and sealed so as to leave a watertight annulus 10. The material of which the concentric cylinders 7 and 8 is composed is irrelevant so long as it is rigid, strong, abrasion resistant and non-conductive of electricity. Certain kinds of well-known polymer plastics, Bakelite, Fiberglas, etc., are suitable. The end plates 9 and 11 are of conductive metal, preferably copper or copper-plated rings insulated on the outside and fitted snugly so as to exactly close the annulus 10. End plate 9 closes the rearward end of the annulus; plate 11 the forward end. A number of pointed projections 22, shown in detail in FIGURE 4, which may be countersunk screws of brass or some other conductive metal, protrude inward from the inner surfaces of plates 9 and 11. The conductive projections 22 assist in maintaining good contact between plates and conductive pellets 17 even at peak amplitudes or vibration. An insulated copper wire 12 connected to end-plate 11 and securely affixed in any suitable manner such as by adhesive (or by being embedded in the outer wall of cylinder 7) leads to the rear end of the instrument and from there via cable 18 to the current source at the mouth of the conduit. The nature and function of shunt 13 is described later. A short copper wire 14 connected to end-plate 9 similarly projects from the rear end of the assembly and passes via wire 37 inside cable 18 to the opposite pole of the current source through an indicator means 37a which may be a voltmeter or other suitable indicator means at the driving face. A carefully measured quantity of very small, dry, spheroidal or granular material 17 hereinafter referred to as "pellets" but which may be filings, particles or grains composed of soft iron, silicon steel, permalloy or other or grains composed of soft iron, silicon steel, permalloy or other conductive material of low magnetic retentivity and preferably about the size of BB shot or smaller is funneled through a hole 16 in outer shell 7 to occupy a small portion of the space in the annulus 10 so that when the instrument is in the horizontal position and is vigorously vibrated the pellets distribute themselves evenly along the floor of the annulus 10 and fill it to a depth such that the level upper surface of the pellet mass 17 will be at a precisely calculated height on each end plate 9 and 11. After calibration of the instrument, the hole 16 is closed and sealed, as by a vibration-resistant screw cap, not shown. Because of the cylindrical cross-section of the annulus 10 the pellets or granular mass will always be arranged in a straight line along the exact bottom of the annulus, and its upper surface will define a horizontal plane no matter what position of rotation the instrument may chance to have. It is also evident that the mass 17 being electrically conductive, will, when the instrument is horizontal or nearly so, afford electrical connection between the two conductive end plates 9 and 11, so that an electric circuit is formed from end plate 9, through pellets 17 to end plate 11 and back again via insulated wire 12 through cable 18 to source seen on the wiring diagram, FIGURE 8, through which an electrical signal is sent. It is also evident that the instrument is responsive to excessive attitude deviation to open this circuit and interrupt the electrical signal. Cable 18 contains three insulated wires 12, 33, 37 which comprise two parallel electric circuits connected with a low-voltage direct-current source. One of these hereinafter called the "plate" circuit is connected to a voltmeter or other receiving and indicating means at the surface on or near the driver and this completes the clinometer portion of the apparatus.

The whole assembly is centered by doughnut-shaped non-conductive centering flanges 19, 20 and 21, FIGURE 2, inside a pipe 2 preferably of diameter and material identical to that of the conduit. The latter is usually threaded at its after end to fit the conduit and may be equipped with a sharpened or pointed penetration tip 2a, FIGURE 6, forward or be left open with an annular tip 2b, FIGURE 4, according to the requirements of the drive.

The volume of pellets 17 introduced into the annulus regulates the sensitivity of the instrument. For example, if the span between end plates is exactly 10 feet and the upper surface of the pellet mass intersects both end plates at exactly 0.1 feet above bottom when it is horizontal, the circuit will remain unbroken as long as the tilt, and therefore the grade of the conduit, is less than 1%. A "tilt" either upward or downward of more than a preselected amount while vibration is in progress will cause the pellets to recede entirely from one or the other of the plates and the connected warning indicator 27a will instantly indicate that the circuit is broken. This indicates at once that the tilt or attitude is excessive. If less sensitivity is desired as when grade alignment is less critical, a volume sufficient to rise to 0.2 or even 0.3 feet in the 10 foot instrument would "permit" tilts of 2% or 3%. It does not matter whether an excessive bend is upward or downward as it must be corrected in either case; however, experience and reference to the alignment system hereinafter described will usually afford a reliable indication of the mis-grade direction. The instrument may, of course, be longer or shorter than the 10 feet cited as an example above, and the volume of pellets required to fill it to the desired level is separately ascertained for each individual instrument.

It is also apparent that the circuit may be designed such that it is normally open until the unit is tilted an excessive amount at which time a warning circuit is closed which activates warning indicator means. Such a warning circuit may be such as that shown in FIGURE 8a and inserted in place of signal indicator 37a in FIGURE 8. As illustrated in FIGURE 8a conductor 132 leads from source S via electromagnetically controlled switch 137 and lead 134 to indicator means 136. Conductor 135 completes this circuit back to the other side of source S. Switch 137 is spring biased to the closed position and is opened by electromagnetic control 138 which forms part of the clinometer circuit between conductors 37 and 133. When the forward end of conduit 2 is on grade within the permissive limits current flows through the clinometer circuit and through electromagnetic means 138 to hold switch 137 in the open position. When the forward end of the conduit goes off-grade the current and voltage in the clinometer circuit drops to zero and switch 137 closes to complete the warning circuit and a signal is indicated by indicator means 136.

The instrument may be preset and calibrated for deliberately inclined grades, "φ" either upward or downward as shown in FIGURES 5 and 6. This is done by placing circular insulating disc rings 23 or 24 over a radially measured width of the outer edge of one or the other of the end plates 11 or 9. By effectively reducing the exposed diameter of one end plate, the shape of the annulus chamber, in respect to the horizontal level maintained by the charge of pellets under the influence of vibration, is that of a section of a cone tapered from one end to the other rather than of a cylinder. When the whole diameter of the rearward conductive plate 9, is exposed and that of the forward one 11 is partially covered by an insulating ring or gasket 23 in FIGURE 5, the circuit is maintained only while the conduit is on a uniform downward grade (FIGURE 5).

When an insulating ring or gasket 24 is placed over the rearward plate 9 and the front plate 11 is exposed (FIGURE 6), the conduit can be driven on a uniform upward grade without breaking the plate circuit. Deviations will, as before, be signalled by an abrupt cessation of current on the voltmeter (V of wiring diagram FIGURE 8) if the horizontal plate defined by the upper surface of the pellets drops below the bottom of the exposed portion of either end plate.

The modification shown in FIGURES 5 and 6 may also be used in pairs to indicate the direction of tilt. For example, a dual clinometer unit is made up of a pair of the clinometers placed in opposed end to end relation so that the ends having the insulating rings 23 and 24 will either abut or be on opposite ends of the apparatus. The chamber 10 of each of the units is filled with enough of the conductive granules 17 to provide the desired sensitivity. Each unit retains its own separate indicator circuit. When in the level position the insulating rings 23 and 24 prevent completion of the circuit and the indicator 37a does not register. When an excessive tilt appears, the circuit of one of the units will be closed and a signal transmitted to the indicator of that unit. It is apparent then that one of the units will indicate the tilt if it is up, and the other unit will indicate the tilt if it is down.

While the embodiment described above and illustrated in the figures is a double-walled cylinder, leaving the central portion open to permit "open-ended" driving (whereby some portion of the displaced soil is allowed to pass into the conduit as a core, to be subsequently flushed out) it is obvious that the instrument would function equally well simply as a chamber with no inner tube or annulus. In the latter embodiment, however, the conduit would be driven "closed-ended," a not uncommon practice, particularly when the tubes are under about 10 inches in diameter.

The attitude responsive means for detecting excessive deviation from grade having now been described, a method and apparatus for detecting excessive deviation from alignment will next be discussed. Referring again to FIGURE 2 and FIGURE 8, a continuous copper wire imbedded just inside the non-conductive outer wall 7 of the instrument is wound in solenoid fashion so as to form a field coil 25, one end of which is connected to the same current-source used for the electroclinometer through shunt switch 13 and wire 33 and the other to conductive end plate 11 and thence by insulated wire 12 back to the source S. This circuit is open and idle when vibration is in progress; but whenever vibration is stopped momentarily as for the coupling-on of a new joint of conduit, shunting switch 13, and an automatic circuit breaker 14 of a kind well known in the art automatically breaks the circuit passing through the bed of pellets and passes it through coil 25. This happens when the pellets are at rest; their mass becomes instantly strongly magnetized owing to its magnetic permeability, static position, and the influence of the insulated field coil 25 wrapped about it. It is thus a "line"-source or generator of a very strong magnetic or electromagnetic signal which easily overrides weak magnetic sources present in the soil. This magnetic signal is therefore easily received and detected at the surface by any suitable means such as magnetic-dip needles of the type used in geophysical prospecting for magnetic ore bodies. A pair of these, or for very fast driving, an array of several pairs are set up in advance of the drive at points such as 6 in FIGURE 1, equidistant from the center line of the course. They are then equalized to correct for any local magnetic variations which may happen to be present, such as influence of buried pipes etc. As the leading joint of conduit passes beneath and between each pair of stations thus prepared, and is momentarily halted (as for joint connection or alignment check) an observer will note the new deflection on each needle. If the deflections are equal or approximately equal the alignment of the conduit may be considered correct. If on the other hand one needle shows a markedly greater deflection than the other, this will be a clear indication that the conduit is bending in the direction of the stronger reading. Pairs of detectors arranged in this way from a quite sensitive combination, for magnetic intensity diminishes as the square of distance from source, and as the "source" moves closer to one detector it must simultaneously move away from the other. Skill acquired by frequent observations in various construction situations enables the observer to know how much disparity of needle readings may be tolerated and even to detect (by relative intensity) when an "off-grade" indication on the electroclinometer is indicative of an upward or downward bend, i.e., whether the head end of the conduit is shallower or deeper than it ought to be.

When driving is resumed after the brief halt described above, shunt switch 13 is responsive to resumption of vibration to redivert the current to the clinometer circuit. The vibration also instantly destroys any vestiges of remnant magnetism which might otherwise linger in the mass of soft iron or alloy pellets, and though some magnetism may linger briefly in conduit 22 itself if it is composed of steel it is not enough ot prevent the pellet mass from resuming its "fluid" function as a level reference-plane inside th body of the clinometer.

The shunting-switch 13 may, as stated, include several kinds of delay switches well known in the electrical art; however, a special feature making it responsive to function automatically as a result of cessation and resumption of vibration is shown in the diagram FIGURE 8. This novel component of the shunting switch (13 in FIGURE 2) is a nonconductive plastic receptacle 26 with an internal cavity 28 circular in cross-section and symmetrical about both its horizontal and vertical axes. It is comprised of two bell-shaped members brought together at their belled ends so as to form a shallow internal trough or groove 27 completely encircling the interior of the cavity midway between its ends where its diameter is maximum. A single solid brass ball 32, the bottom contour of which fits easily into this groove is the only loose object inside the cavity. Two copper rings 29 and 30 parallel the axis of the groove and are partially imbedded in the plastic but project slightly into it, thus leaving two circlets of bare copper wire 29, 39 on either side of the groove 27. One 29 is connected by wire 33 to source; the other 30 by wire 25a to automatic circuit-breaker 35. These are spaced far enough apart so that the brass ball 32 will bridge between them when it is resting in the groove 27.

It will be apparent from FIGURE 8 that during vibration the direct current flowing from source S will pass through wire 37, through the spring-plate 34 of a common automatic circuit breaker and thence via wire 14 to end-plate 9; thence through the pellet-bed 17 to plate 11 and back to source via wire 12, for while vibration is in progress the brass ball 32 in receptacle 26 is being accelerated back and forth in cavity 28 at a velocity too high for it to enter the groove 27. The parallel circuit through the magnetic circuit-breaker 35 to the field coil 25 therefore remains open and inoperative. Soon after vibration is stopped, however, ball 32 comes to rest in the groove 27, thereby bridging the gap between rings 29 and 30 and the wires 33 and 25a connected to them. This completes a parallel circuit, energizes the magnet of the circuit-breaker 35 which strongly attracts the usual soft-iron pad attached to spring plate 34, thus breaking the clinometer circuit. All the available current then flows through field coil 25 to end plate 11 and back to source via wire 12. Resumption of vibration unseats the brass ball, breaks the circuit and thereby releases the magnetic force holding back spring plate 34 which springs back to its normal position, thus restoring the clinometer circuit.

The description of this invention and drawings of details concerning it in certain embodiments reveal fully its principle features; however, it is evident that many modifications tending to improve its usefulness for underground pipe and conduit driving can be made without departing from the essential features disclosed and claimed herein. For example, while low-voltage-direct-current source and voltmeter-at-the-surface connected to the instrument by insulated cable outside or inside the conduit driven are often convenient, it is also possible to make the clinometer self-contained by incorporating a hollow cylindrical dry cell battery in an extenison of the after end of the main sensing instrument and affixing to it also at the rear end a large electric gong of a type such as is used for fire or burglar alarms. This will ring loudly and be heard steadily at the mouth of the conduit as long as current flows in the clinometer circuit and the drive is progressing satisfactorily. The gong goes silent, however, whenever the conduit heads downward or upward off grade and the operator is thus warned. It is also silent during halts for pipe connection or alignment monitoring. While the monitoring of both grade and aligment is essential for straight conduit or pipe line driving, it often happens that they are not equally important.

It will be seen that a less expensive version of the above-described instrument could be the electro-clinometer portion only, in which case field coil 27 shunt switch 13 and circuit breaker 35 and all wiring for the electromagnet could be eliminated, and the "pellets" could consist of any conductive metal including aluminum or copper.

Similarly, still another version could have a single circuit manually operated at the surface to magnetize the pellet mass and in this case the instrument in conjunction with above ground magnetic detectors would monitor alignment only.

It is also obvious that a wide variety of different materials might be chosen for conductive, non-conductive and magnetic "core" components without departing from the nature of the inventiton described herein, and its dimensioning and arrangements of components similarly may be varied widely in different embodiments without departing from the spirit and scope of the appended claims.

I claim as my invention:

1. In a method of driving an elongated structural member substantially horizontally through an earth formation the steps of:
   placing signal generating means at the forward end of an elongated structural member;
   aiming said elongated structural member along a preselected substantially horizontal path through an earth formation;
   driving said elongated structural member substantially horizontally along said pre-selected path through said earth formation;
   transmitting a first signal from said signal generating means;
   receiving said signal at a point remote from said generator;
   monitoring any substantial deviation of said member from its desired course by means of said received signal;
   transmitting a second signal from said signal generating means having a distinct character from said first signal; and
   receiving said second signal at a point above and substantially along the desired course of said member with means for indicating the lateral position of said member with respect to the desired course of said member.

2. The method of claim 1 wherein the step of driving said member comprises the steps of:
   vibrating said member at substantially its resonant frequency; and
   applying forward pressure along the axis of said member and along the direction of the desired course.

3. The method of claim 1 characterized in that: said first signal is electrical;
   said second signal is magnetic.

4. The method of claim 1 including the further steps of:
   providing control means for said signal generating means;
   said control means being responsive to vibratory driving of said structural member to interrupt one of said first and said second signals and initiate the other of said signals.

5. The method of claim 1 including the further step of:
   providing said signal generating means with attitude responsive means to interrupt said first signal in response to excessive deviation of said means from the desired attitude.

6. The method of claim 5 including the further steps of:
   controlling said signal generating means in response to vibrating said structural member including;
   interrupting one of said first and said second signals in response to vibrating said member, and
   substantially simultaneously initiating the other of said signals.

7. In a system for monitoring the deviation of the forward end of an elongated structural member as it is being sonically driven substantially horizontally through an earth formation:
   means to detect excessive axial deviation of said member from its desired course;
   at least part of said means being carried by the forward end of said member;
   said part of said means comprising an elongated annular chamber constructed of non-conductive material;

a pair of conductor rings, one mounted in each end of said chamber;

a portion of vibrationally-flowable solid granular conductive material in said chamber sufficient to bridge the gap between said rings when the axis of said chamber is substantially horizontal; and indicator means including an electrical circuit connected to said conductor rings.

8. The system of claim 7 including:

first circuit means for said first signal generating means;

second circuit means for said second signal generating means;

means for switching from one of the circuit means to the other of said circuit means;

said switching means being responsive to the vibratory driving of said elongated member to switch to said first circuit; and means responsive to the halting of said driving to switch to said second circuit means.

9. The system of claim 7 wherein said detection means comprises:

first signal generating means; and second signal generating means.

10. The system of claim 9 including:

magnetic sensing and indicating means positioned along the desired course of said elongated member to indicate the lateral position thereof in relation to said desired course;

wherein said first signal is a substantially continuous electrical signal; and said second signal is a substantially continuous magnetic signal.

References Cited

UNITED STATES PATENTS

| | | | |
|---|---|---|---|
| 3,282,355 | 11/1966 | Henderson | 175—40 X |
| 3,283,833 | 11/1966 | Bodine | 175—62 |
| 3,285,350 | 11/1966 | Henderson | 175—40 X |

CHARLES E. O'CONNELL, Primary Examiner

RICHARD E. FAVREAU, Assistant Examiner

U.S. Cl. X.R.

175—56